United States Patent [19]

Okumura

[11] Patent Number: 5,708,471
[45] Date of Patent: Jan. 13, 1998

[54] IMAGE SENSORS AND DRIVING METHOD THEREOF

[75] Inventor: Fujio Okumura, Tokyo, Japan

[73] Assignee: NEC Corporation, Tokyo, Japan

[21] Appl. No.: 511,444

[22] Filed: Aug. 4, 1995

Related U.S. Application Data

[63] Continuation of Ser. No. 215,719, Mar. 22, 1994, Pat. No. 5,479,208.

[30] Foreign Application Priority Data

Mar. 25, 1993 [JP] Japan ................................ 5-066367

[51] Int. Cl.$^6$ .................................. H04N 3/14; H04N 5/335
[52] U.S. Cl. .................. 348/301; 348/308; 250/214 A; 327/514; 359/189; 358/482
[58] Field of Search .............................. 348/241, 248, 348/249, 250, 301, 308, 297; 327/77, 514; 257/292, 239; 359/189; 250/208.1, 214 A, 214 R; 358/482

[56] References Cited

U.S. PATENT DOCUMENTS

| | | | |
|---|---|---|---|
| 4,809,074 | 2/1989 | Imaide et al. | 348/241 |
| 4,827,345 | 5/1989 | Nakagawa et al. | 358/482 |
| 5,198,660 | 3/1993 | Yokoyama et al. | 250/214 A |
| 5,256,986 | 10/1993 | Flocke et al. | 330/293 |

FOREIGN PATENT DOCUMENTS 60-69968  4/1985  Japan .
60-69969  4/1985  Japan .

*Primary Examiner*—Andrew Faile
*Assistant Examiner*—Andrew B. Christensen
*Attorney, Agent, or Firm*—Whitham, Curtis, Whitham & McGinn

[57] ABSTRACT

An image sensor of charge storage type and a driving method of the image sensor. A light signal from a photosensitive element is read by an amplifier and the read signal is held in a sample hold circuit of a signal detector. Next, a voltage is given from a variable power source to the amplifier and a signal output from the amplifier is compared with the previously held signal in a comparator in the signal detector. The voltage of the variable power source at an equal point where the two signals are coincident with each other in the comparison is read as a true value. Hence, irrespective of dispersion of characteristics of amplifiers, the correct value can be always detected. The influences of the dispersion of the amplifiers, a temperature change and a time-drift of TFT characteristics are removed to improve S/N.

20 Claims, 8 Drawing Sheets

IMAGE SENSORS AND DRIVING METHOD THEREOF

This is a continuation of application Ser. No. 08/215,719 filed Mar. 22, 1994, U.S. Pat. No. 5,479,208.

BACKGROUND OF THE INVENTION

The present invention relates to single, linear or one-dimensional and two-dimensional image sensors having field-effect transistors used as switching elements and a driving method of the image sensors.

DESCRIPTION OF THE RELATED ARTS

At present, image sensors are classified broadly into CCD (charge coupled device) types composed of CCD's and photodiodes and MOS (metal-oxide semiconductor) types composed of field-effect transistors (FET's) of the MOS type and photodiodes. The present invention relates to MOS image sensors.

The MOS image sensor performs a charge storage operation. FIG. 1 shows a basic circuit of a MOS image sensor. In FIG. 1, the image sensor is comprised of a photosensitive element 41 such as a photodiode or a photoconductor connected to a bias power source 42, switches 43 and 44 of MOS transistors having respective gate electrodes 45 and 46 for an element selection and a resetting, respectively, and an amplifier 47 connected to an output terminal 48.

In the charge storage image sensor, first, the switches 43 and 44 become on to store electric charge equivalent to the capacitance of the photosensitive element 41. At this time, the voltage between the both ends of the photosensitive element 41 is equal to the voltage of the bias power source 42. Next, when the switches 43 and 44 are turned off, the photosensitive element 41 is separated from the circuit. In this situation, when light is irradiated to the photosensitive element 41, a photoelectric current flows to discharge the electric charge previously charged. The electric charge amount to be discharged depends on the photo-charge and hence the voltage of the photosensitive element 41 varies depending on the photo-charge. After the light is emitted on the photosensitive element 41 for a fixed period (this period is called a storage time), by turning on the switch 43, the voltage of the photosensitive element 41 can be read by the amplifier 47. This is amplified by the amplifier 47 and the amplified voltage is output to the output terminal 48. Thereafter, the switch 44 is turned on again to repeat the above-described operation.

In case of linear or one-dimensional or two-dimensional image sensor, the construction is basically the same as described above except that the switch 43 is made in a matrix form. Further, in other cases, as disclosed in Japanese Patent Laid-Open Nos. Sho 60-69968 and 60-69969, the positions of the switch 43 and the amplifier 47 are replaced with each other.

Further, in recent years, as regards the MOS transistors, the amplifier and the photosensitive element, thin-film transistors (TFT's) composed of polycrystalline silicon, amorphous silicon and the like in addition to monocrystalline silicon are often used for the switches and the amplifier and the amorphous silicon as the photosensitive element is also often used.

In the conventional image sensors, there is a large problem concerning noise. In general, a light signal of the image sensor is very small. For example, in a contact-type linear image sensor for facsimiles, assuming that a resolution is 16 lines/mm, a storage time per one line is 1 ms and an illuminance on the sensor surface is 100 lux, the electric charge obtained by the light in one sensor element is 0.15 pC at the most. Supposing that the capacitance on the basic circuit is several pF, the signal voltage is only approximately several tens of mV. This is the case that the amplifier 47 is mounted quite close to the element as shown in FIG. 1. In the case where the amplifier is formed for amplification of a plurality of elements or all the elements away therefrom, the capacitance is increased and thus the voltage is further reduced.

Although the amplifier is provided because of the small signal, in case of a small signal input to the amplifier, an input offset of the amplifier can not become ignored. An input offset of a usual operational amplifier is on the order of 1 to several mV and its variation amount is also expected to be roughly the same order. Assuming that the signal voltage is several tens of mV at the most, even in a good condition case, S/N would be less than 10. Whatever may be the case of binary, it is not enough to produce half tone.

In the case where a single amplifier detects signals of all elements, it is liable to recognize that the influence of the input offset can be avoided but this is not true. As described above, by the capacitance increase due to the parasitic capacitance up to the amplifier, the light signal itself is minimized to degrade S/N and it can be unavoidable from the influences of a temperature change and a time-drift of TFT characteristics. Further, in another case where each element is provided with an amplifier, since the capacitance can be restricted to a small value, the signal amount can be taken to a large value but the influence of the dispersion of the input offset of each amplifier can not be ignored. This case is also subjected to the influence of the temperature change and the time-drift of TFT characteristics. Particularly, in the case that the amplifier is prepared by using TFT's, the performance degradation of the TFT's is fairly larger than the single-crystalline transistors and hence the dispersion of the characteristics as the amplifier becomes larger.

Moreover, in a two-dimensional or one-dimensional image sensor, when a matrix driving is taken place, in addition to the problem of only the amplifier, a problem of crosstalk of signals due to parasitic capacitance between wirings arises. As described above, various factors bring about the lowering of S/N.

SUMMARY OF THE INVENTION

Therefore, it is an object of the present invention to provide an image sensor in view of the aforementioned problems of the prior art, which is capable of removing influences of input offset of an amplifier, dispersion of an amplification factor, a temperature change, a time-drift of TFT characteristics and the like and achieving a high S/N.

It is another object of the present invention to provide a driving method of an image sensor which is capable of removing influences of input offset of an amplifier, dispersion of an amplification factor, a temperature change, a time-drift of TFT characteristics and the like and achieving a high S/N.

In accordance with one aspect of the present invention, there is provided an image sensor, comprising a photosensitive element having one terminal connected to a bias voltage; an analog switch having one terminal connected to another terminal of the photosensitive element; an amplifier having an input terminal connected to another terminal of the photosensitive element; a variable power source connected to another terminal of the analog switch; and a signal detector connected to an output terminal of the amplifier, which holds a first signal output from the amplifier and compares the first signal held with a second signal output from the amplifier after the first signal, the image sensor storing photoelectric charge generated by the photosensitive element during a storage period and reading the photoelectric charge as a variation of a voltage.

In accordance with another aspect of the present invention, there is provided a driving method of an image sensor, comprising the steps of turning on an analog switch to apply a voltage from a variable power source to a photosensitive element to charge electric charge in the photosensitive element; turning off the analog switch to store photoelectric charge generated in the photosensitive element during a storage period; reading a voltage by an amplifier after the storage of the photoelectric charge in the photosensitive element; holding the read signal in a signal detector; turning on the analog switch again to apply a voltage having an amplitude of at least a maximum voltage variation of the photosensitive element from the variable power source to the amplifier; comparing an output of the amplifier with the previously held signal; reading the signal output from the amplifier as a true signal at an equal point where the output of the amplifier is coincident with the previously held voltage in the comparison; and determining the voltage of the variable power source right before the turning off of the analog switch as a charge voltage to be input to the photosensitive element.

In accordance with still another aspect of the present invention, there is provided a driving method of an image sensor, comprising the steps of turning off an analog switch to give a predetermined voltage from a variable power source to an amplifier; holding an output of the amplifier against the voltage from the variable power source in a signal detector; turning on the analog switch in an actual reading operation to give a fixed voltage from the variable power source to a photosensitive element to charge electric charge in the photosensitive element; storing photoelectric charge in the photosensitive element during a storage period after turning off the analog switch; reading the charge stored in the photosensitive element by the amplifier; and comparing the read value with the previously held value to read the read value as a true signal.

In one image sensor, the signal detector includes a sample hold circuit for holding the first signal output from the amplifier; and a comparator for comparing the first signal held in the sample hold circuit and the second signal output from the amplifier.

In another image sensor, the signal detector includes an analog-digital converter for digitizing the signal output from the amplifier; a memory for storing a first digital signal output from the analog-digital converter; and a logic circuit for comparing the first digital signal stored in the memory with a second digital signal output from the analog-digital converter after the first digital signal.

The analog switch is composed of a TFT.

The signal detector further includes a signal converter for outputting a voltage of the variable power source corresponding to the signal on the basis of a comparison signal output from the comparator.

In the driving method, the output of the amplifier is digitized in an analog-digital converter to output a digital signal, and the holding of the digital signal in the signal detector is carried out either right before an imaging or on the basis of a predetermined condition by a temperature change.

In the driving method, a detection of an equal point where the output of the amplifier is coincident with the previously held voltage in the comparison is carried out in the signal detector.

A plurality of amplifiers are provided and the amplifiers are successively switched on.

A plurality of amplifiers are provided and are divided into blocks and the amplifiers are switched on every block.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
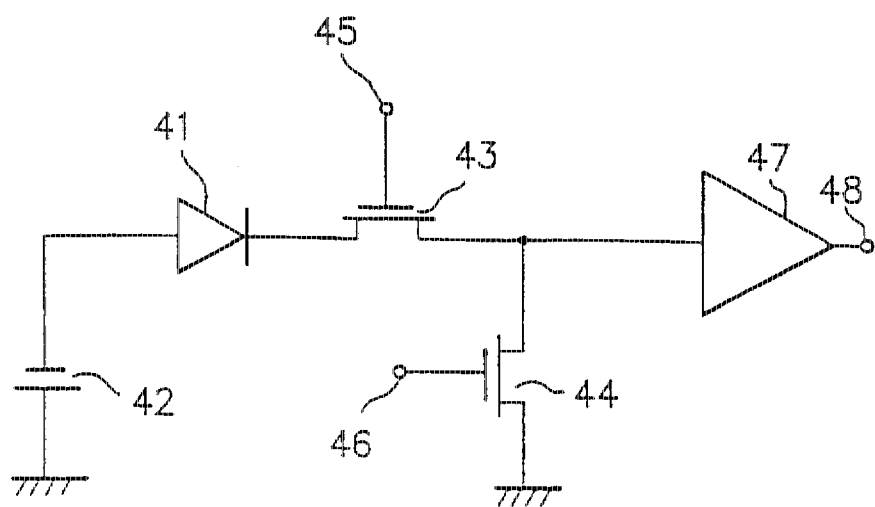
FIG. 1 is a circuit diagram of a conventional image sensor.

The present invention will now be described in connection with its preferred embodiments with reference to the accompanying drawings, wherein like reference characters designate like or corresponding parts throughout the views and thus the repeated description thereof can be omitted for brevity.

Figure 2:
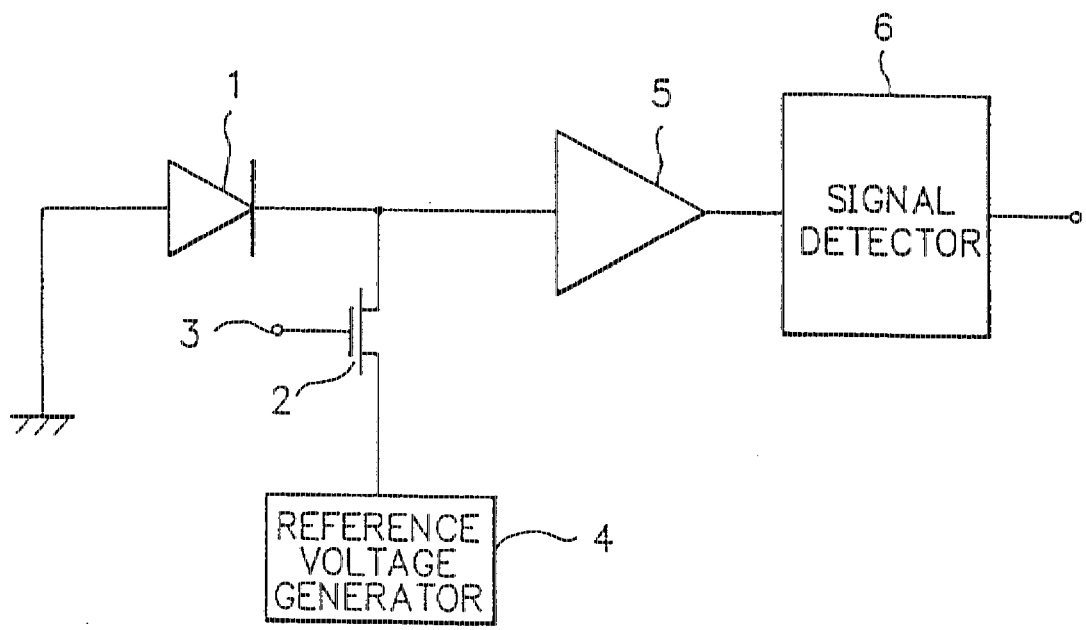
FIG. 2 is a circuit diagram of one embodiment of an image sensor according to the present invention.

FIG. 2 illustrates a basic construction of one embodiment of an image sensor according to the present invention. The image sensor is comprised of a photosensitive element 1 such as a photodiode, a photoconductor or the like, an analog switch 2 having a gate electrode 3, composed of a MOS transistor or a MOS or MIS (metal-insulating film-semiconductor structure) TFT, a reference voltage generator 4, an amplifier 5 and a signal detector 6.

In this embodiment, a large difference from a conventional construction is an existence of the reference voltage generator 4. As shown in FIG. 1, in the conventional sensor, it is a mere ground voltage and a bias voltage is given from a particular power source. In this embodiment, the reference voltage generator 4 not only supplies a bias voltage but also performs a calibration of the amplifier 5.

Figure 3:
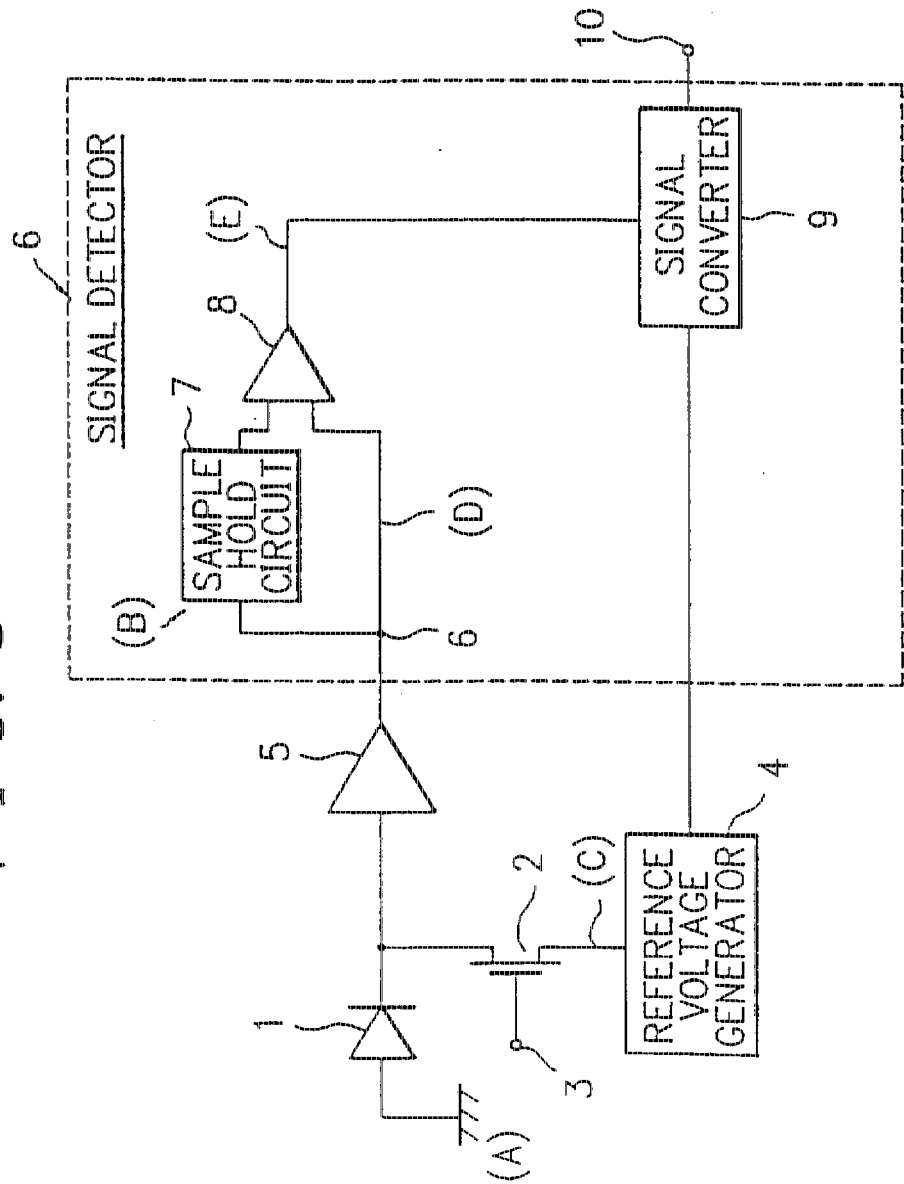
FIG. 3 is a circuit diagram of another embodiment of an image sensor according to the present invention.

First, a driving method of this image sensor will now be described. FIG. 3 shows one embodiment of a driving circuit of the image sensor. In FIG. 3, the signal detector 6 is composed of a sample hold circuit 7, a comparator 8 and a signal converter 9 connected to an signal output terminal 10. In FIG. 3, symbols (A) to (E) correspond to those shown in FIG. 4.

Figure 4:
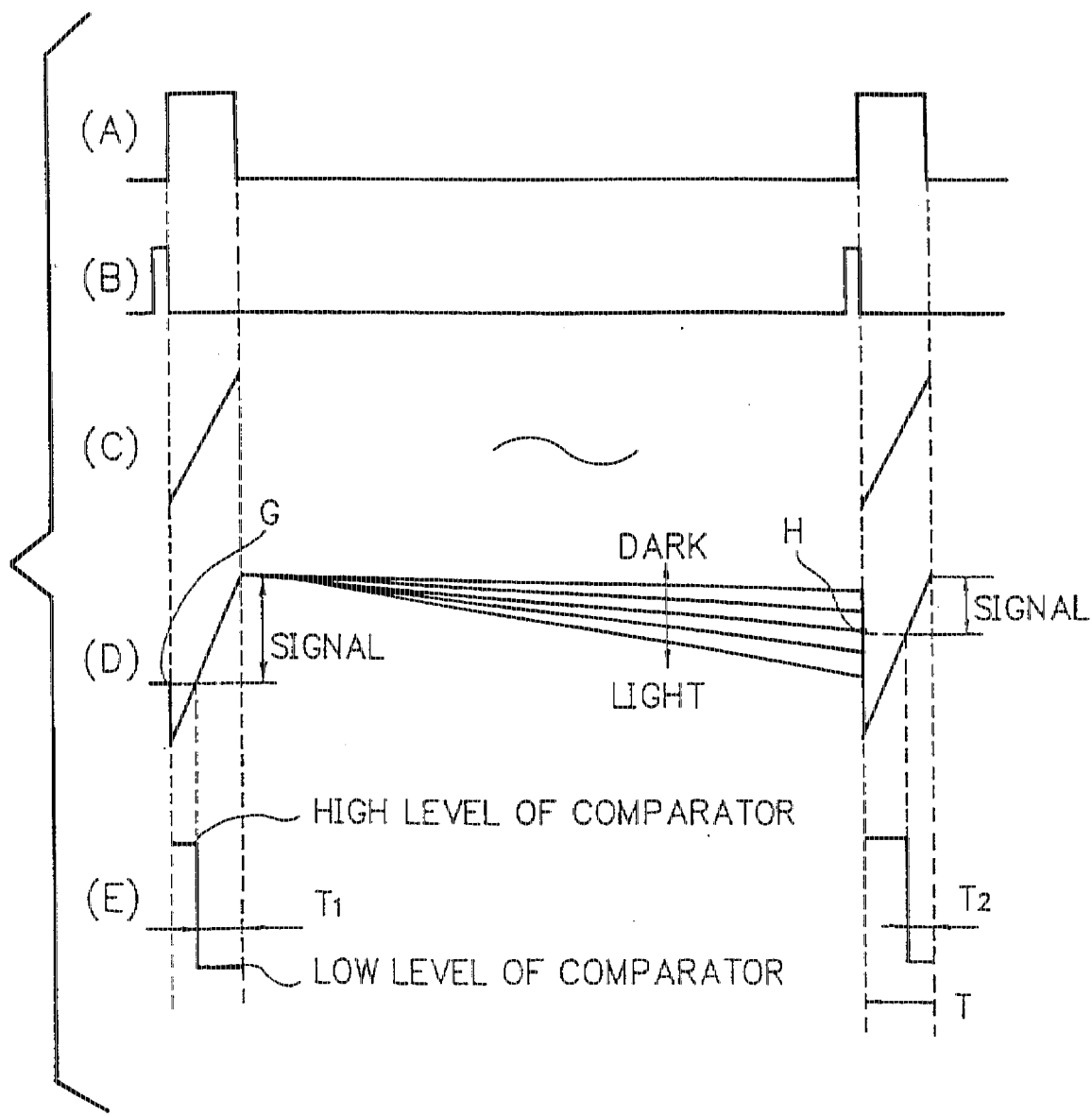
FIG. 4 is a timing chart of signals appearing in the image sensor shown in FIG. 3.

The description of the operation starts from that a voltage is applied to the photosensitive element 1 to charge the electric charge and this is reduced by the photoelectric charge during the storage time in the same manner as the conventional image sensor. In this state, the amplifier 5 outputs the light signal. At this time, when a sample pulse shown by (B) in FIG. 4 is supplied to the sample hold circuit 7, the sample hold circuit 7 holds this signal voltage. Next, as shown by (A) in FIG. 4, by giving a pulse to the gate electrode 3 of the analog switch 2, the analog switch 2 is changed to the on-state so as to supply a reference voltage, as shown by (C) in FIG. 4, from the reference voltage generator 4 to the amplifier 5. If the reference voltage is designed so as to vibrate at a width equal to or more than the maximum voltage variation of the photosensitive element 1, the reference voltage can necessarily pass through the same voltage as the signal voltage. The reference voltage amplified in the amplifier 5 and the voltage held in the sample hold circuit 7 are compared with each other in the comparator 8 and, as shown by (E) in FIG. 4, the output of the comparator 8 is inverted when the amplified reference voltage and the signal voltage of the photosensitive element 1 are coincident with each other. Hence, by detecting the reference voltage at the time when the comparator 8 is inverted, the actual voltage of the photosensitive element 1 can be known. The signal converter 9 functions so as to detect the variation of the comparator 8 and to output the reference voltage at that time. Further, the last voltage of the reference voltage in the period when the analog switch 2 is on becomes the bias voltage to be applied to the photosensitive element 1, and the operation of the charge storage image sensor is repeated.

In FIG. 4, two times of signal readings are shown. At (D) in FIG. 4, against a large light signal such as at the point G, the output of the comparator 8 is inverted in a short time as indicated by T1 and against an intermediate light signal at the point H, the output is inverted in an intermediate time as indicated by T2. When the light is not incident at all, the inverting time becomes longest and is coincident with nearly the pulse width T shown by (A) in FIG. 4.

In this case, when it is necessary to pay attention to is a voltage waveform of the reference voltage. The requirements of the reference voltage are only that the voltage variation is equal to or more than the voltage variation of the photosensitive element and that the final voltage is the bias voltage, and the ramp waveforms shown in FIG. 4 are not necessarily required. For example, an increase in secondary-functional, an increase in exponential-functional and on the other hand, once reducing from a certain voltage to return to the bias voltage can be used.

Figure 5:
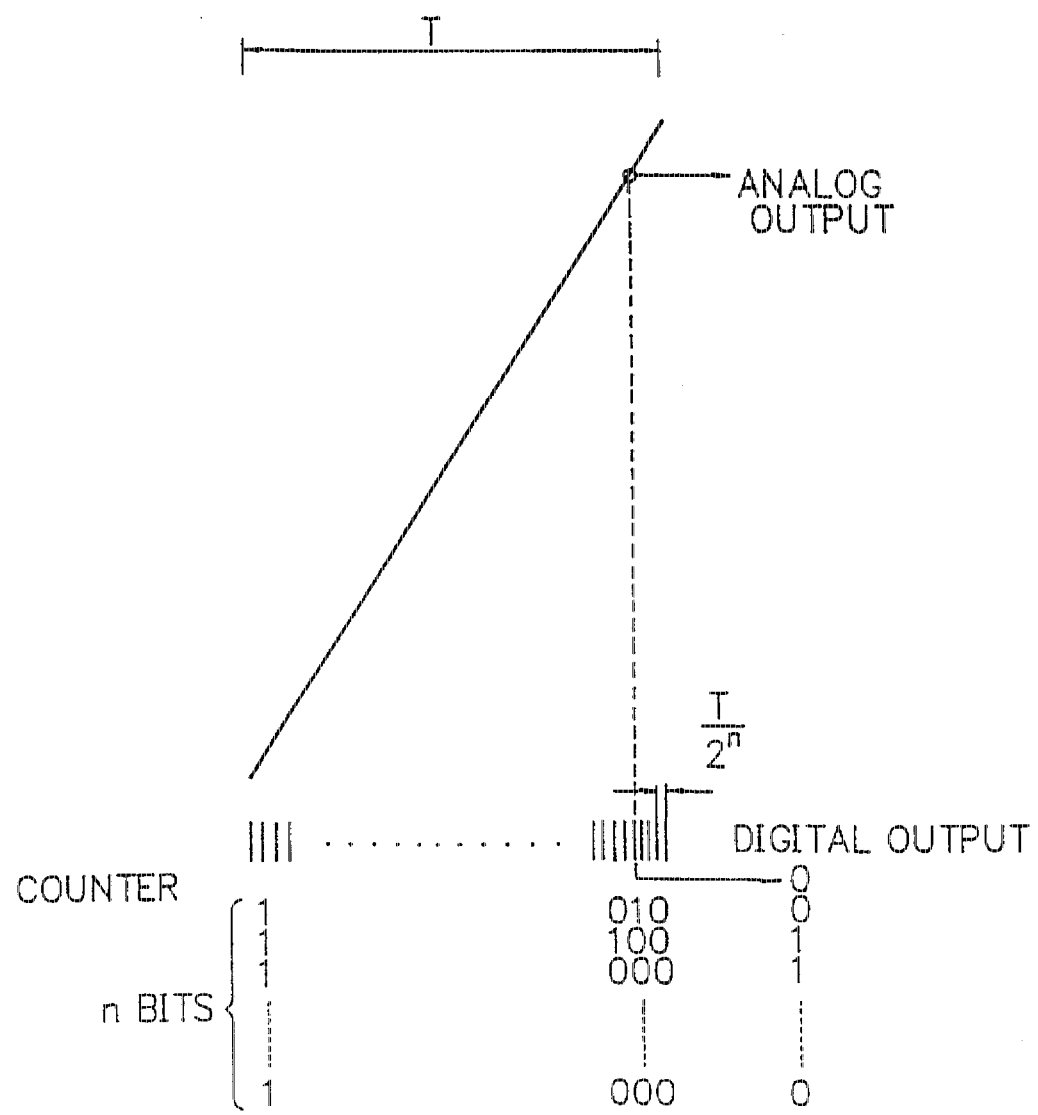
FIG. 5 is a schematic view showing a reference voltage variation for explaining a driving method of the image sensor shown in FIG. 3.

The operations of the reference voltage generator 4 and the signal converter 9 will be further described with reference to one example of a realization method in connection with FIG. 5. In FIG. 5, a slant line shown in the center indicates a variation of the reference voltage. In this case, a ramp voltage generator as the reference voltage generator 4 is used and as to the signal converter 9, any means capable of detecting the inversion of the comparator 8 and outputting the reference voltage as it is at that time to the signal ouput terminal 10 can be used. Hence, the signals are analog values.

There are several methods for digitizing the signals. In the case where a similar ramp voltage generator is used as the reference voltage generator 4, when the ramp voltage varies linearly relative to the time, a counter is provided and a value of the counter can be used as the signal at the conversion of the comparator 8. Also, a D/A (digital-analog) converter is used as the reference voltage generator 4 to generate the voltage stepwise and an input signal to the D/A converter at the inversion of the comparator 8 can be read.

As described above, according to the present invention, by using the reference voltage, the charging of the electric charge to the photosensitive element and the SO calibration of the amplifier are carried out. In this case, concerning the calibration, there is no need to memorize the relationship between the input and the output of the amplifier. It is because, as described above, it is sufficient that only an agreeing point between the reference voltage and the signal voltage can be detected. Thus the linear amplifier is not necessarily required and, even when they are varied by the temperature change or the time-drift of TFT characteristics, no problem arises. Further, in the case where a plurality of amplifiers are used in one-dimensional or two-dimensional image sensor, even if the input offsets of the amplifiers and the characteristics such as the amplification factor and the like are dispersed, a precise reading can be taken place without any trouble. The advantage of the image sensor of the present invention is strong against such variation factors.

Further, in this embodiment, although the system is composed of the analog circuits, in particular, almost all of these can be replaced with digital circuits. For example, the sample hold circuit can be replaced with an A/D (analog-digital) converter and a latch circuit and the comparator is replaced with a comparator composed of a logic. The signal converter can, of course, be digitized as described above.

Next, another embodiment of a driving method of an image sensor according to the present invention will now be described in connection with FIG. 6.

Figure 6:
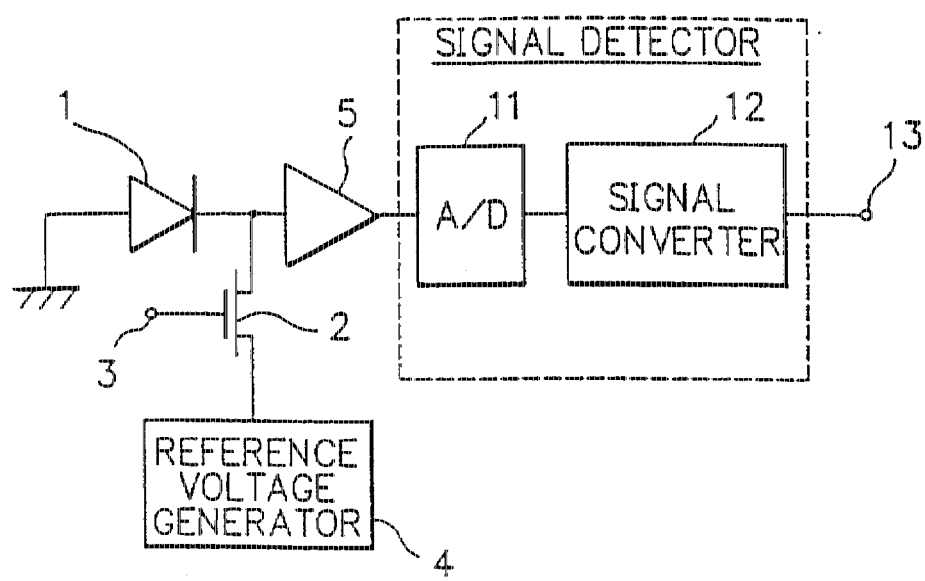
FIG. 6 is a circuit diagram of a further embodiment of an image sensor according to the present invention.

In this embodiment, as shown in FIG. 6, the signal detector 6 is composed of an A/D converter 11 and a signal converter 12 connected to a signal output terminal 13. The signal converter 12, different from the previous embodiment, is composed of a memory and a logic. In this embodiment, first, the reference voltage generator 4 generates a reference voltage and an output of the amplifier 5 corresponding thereto is digitized by the A/D converter 11. The obtained digital data are stored in the memory of the signal converter 12. Next, in the reading operation, the read value and the memory data are compared with each other to output data to the signal output terminal 13. The advantage of this method is that there is no need to execute a reference operation every time and thus the reading can be quickly carried out. The writing of the data into the memory by the reference operation can be taken place right before the imaging or by detecting the temperature change or the like.

Next, a further embodiment applied to a linear or one-dimensional image sensor according to the present invention will now be described with reference to FIG. 7.

Figure 7:
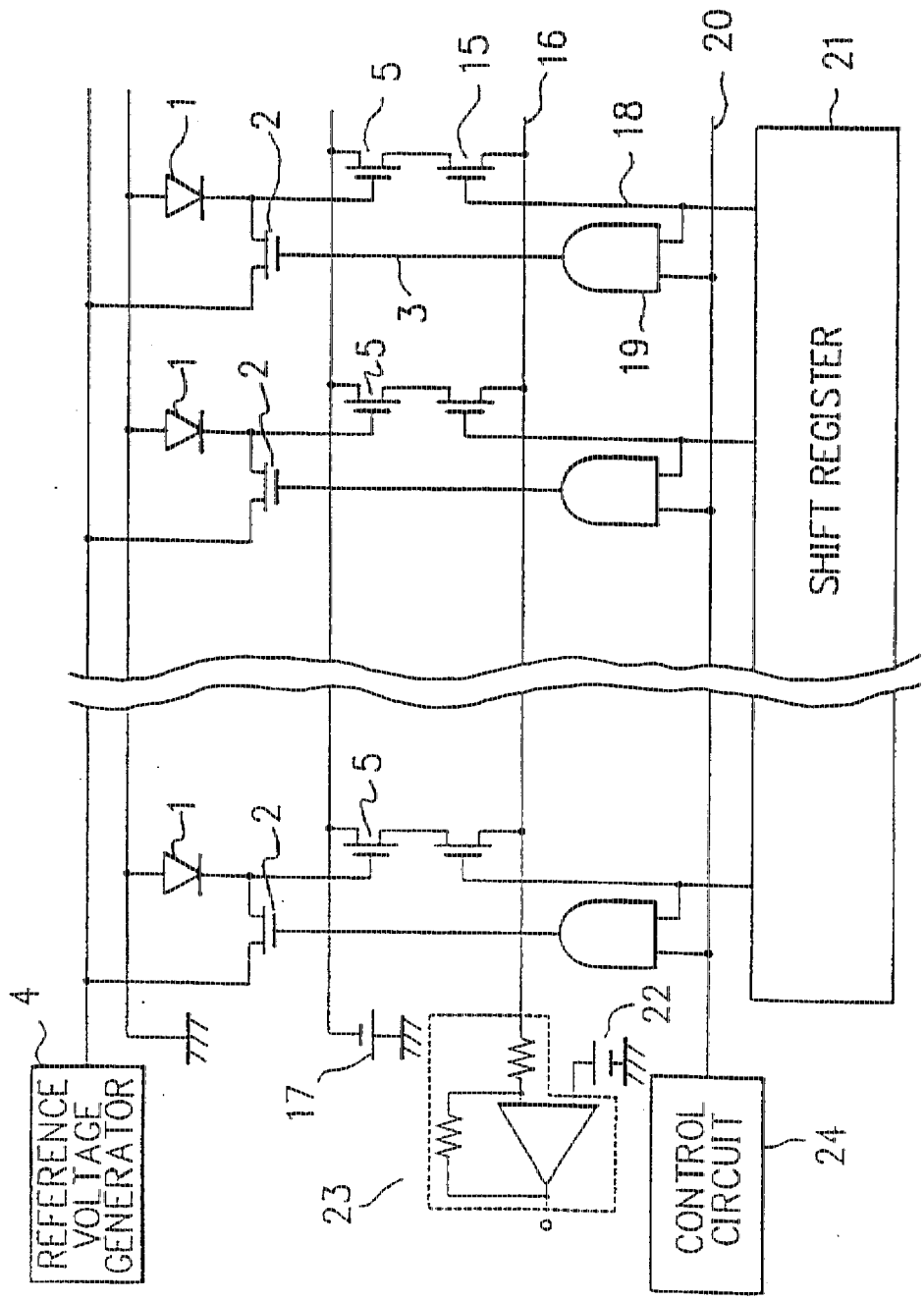
FIG. 7 is a circuit diagram of another embodiment of an image sensor according to the present invention.

In this embodiment, as shown in FIG. 7, each amplifier 5 is composed of one MOS transistor. In this case, a voltage change of a photosensitive element 1 is applied to the gate of the transistor 5 and a drain current against this voltage is read. Hence, the drain current in relation to the input voltage becomes non-linear. The image sensor further includes a plurality of element selection switches 15, corresponding to a plurality of amplifiers 5, for switching the basic elements, a signal wire 16, a negative side bias power source 17 for biasing the amplifiers 5 to the operational point, signal wires 18 for the element selection, AND circuits 19 for controlling the reference voltage, a reference voltage control signal wire 20, a shift register 21, a bias power source 22, an amplifier 23 and a control circuit 24 for controlling on and off of the reference voltage.

In this embodiment, the linear scanning is taken place by successively turning on the element selection signal wires 18 by the shift register 21. The control circuit 24 sends a control signal for activating the AND circuits 19 so as to apply the reference voltage to the elements. In this case, the output of the amplifier 23 is read by a signal detector (not shown) in the same manner as the embodiments shown in FIGS. 2 and 6.

In this embodiment, what is emphasized is that the amplifiers 5 and the amplifier 23 can be corrected as a whole and the influences by the variation and dispersion of all the amplifiers can be discharged. Further, the amplifiers 5 can be composed of single transistors and no problem of the dispersion occurs. Hence, in this embodiment, the TFT's can be used. The advantages of the TFT's are high density of devices, compactness and low cost, which are very much profitable.

Then, still another embodiment of an image sensor according to the present invention, which can carry out a matrix reading in a linear or one-dimensional image sensor, will now be described in connection to FIG. 8.

Figure 8:
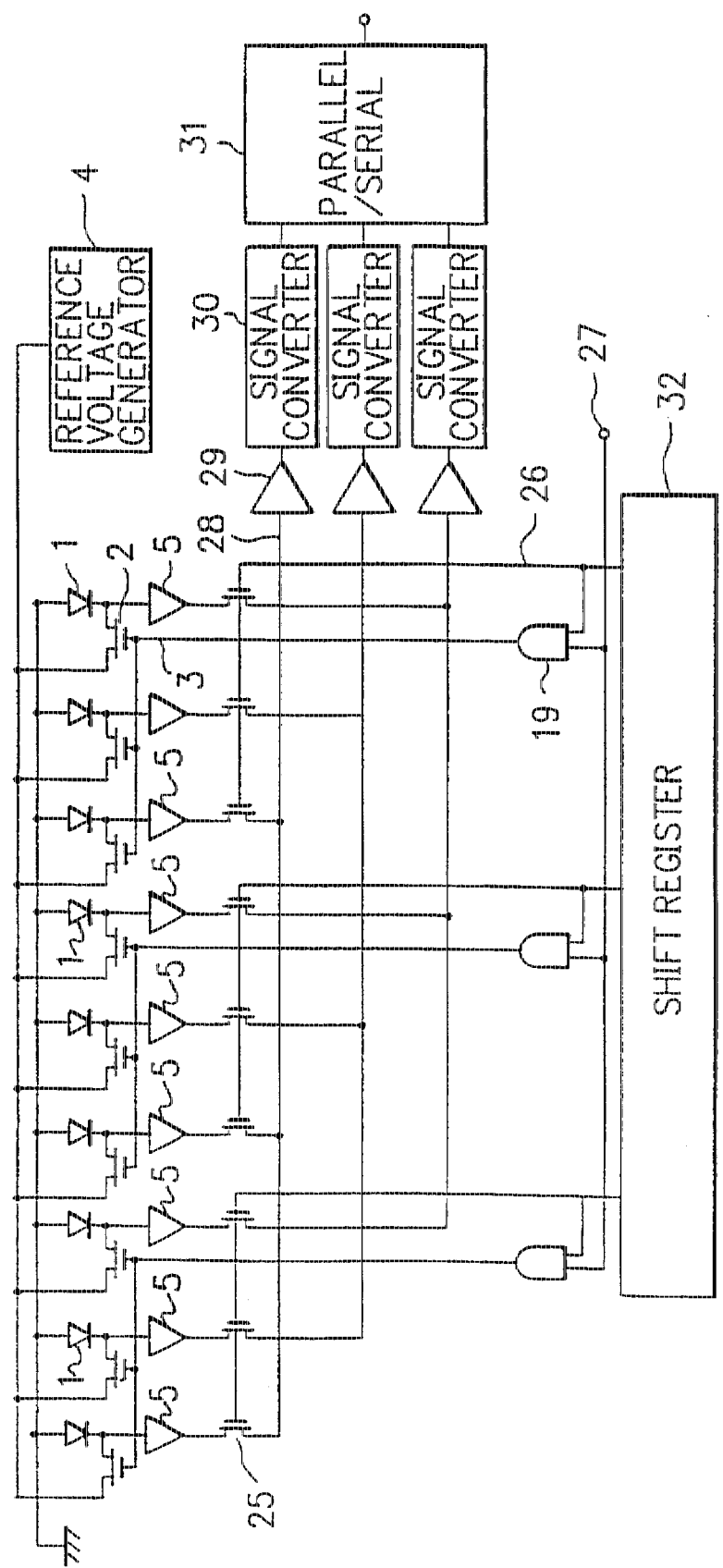
FIG. 8 is a circuit diagram of still another embodiment of an image sensor according to the present invention.

In this embodiment, as shown in FIG. 8, the image sensor further includes a plurality of block selection switches 25, corresponding to a plurality of amplifiers 5, for selecting blocks obtained by dividing the whole, whose gates are connected in common by block selection signal wires 26 so that the whole may be switched every block, AND circuits 19 for controlling the reference voltage, to which a reference voltage control signal 27 is applied, signal wires 28, amplifiers 29, signal converters 30, a parallel/serial converter 31 and a shift register 32.

In this embodiment, one block of elements are switched together and the signals are read every block. Hence, the reference voltage is also applied every block and a signal conversion is taken place every block. Thereafter, the signals are converted into serial signals in the parallel/serial converter 31 to output the serial signals. Basically, such a matrix structure is equal to a two-dimensional image sensor and is readily extensible to two-dimension and even a two-dimensional sensor of an image sensor according to the present invention can be applied. Further, usually, in such a matrix structure, as described above in the conventional example, a problem of crosstalk between wirings arises. However, in this embodiment, since the amplifiers can be prepared by a simple construction, the amplifier can be provided for every sensor element and hence the image sensor becomes strong against the crosstalk.

As described above, according to the present invention, the input offset of the amplifier, the dispersion of the amplification factor and their temperature change and time-drift of TFT characteristics can be readily corrected to realize the image sensor with high S/N. Actually, when the image sensor of the present invention and the conventional image sensor are compared with each other, for example, in the one-dimensional image sensor, S/N of 10:1 in the conventional image sensor can be raised to 100:1 in the image sensor according to the present invention. Further, the two image sensors are placed under the same environment and, when the temperature is raised to 60° C., while S/N is reduced to 4 to 5:1 in the conventional image sensor, S/N of nearly at least 100:1 is maintained in the image sensor according to the present invention.

Further, when the circuit shown in FIG. 7 is fabricated by using polycrystalline silicon TFT's and amorphous silicon photodiodes, though the dispersion of threshold voltage values of the polycrystalline silicon TFT's is±1V, the value of at least 100:1 as S/N can be obtained. As described above, by using the image sensor and its driving method according to the present invention, an image sensor capable of obtaining very stable output against all variable factors can be realized.

Although the present invention has been described in its preferred embodiments with reference to the accompanying drawings, it is readily understood that the present invention is not restricted to the preferred embodiments and that various changes and modifications can be made by those skilled in the art without departing from the spirit and scope of the present invention.

What is claimed is:

1. An image sensor, comprising:
   a photosensitive element having a first terminal connected to a predetermined voltage;
   an analog switch having one terminal connected to a second terminal of the photosensitive element;
   an amplifier having an input terminal connected to said second terminal of the photosensitive element;
   a variable power source connected to another terminal of the analog switch; and
   a signal detector connected to an output terminal of the amplifier, for holding a first signal output from the amplifier and for comparing the first signal held with a second signal output from the amplifier after the first signal,
   the image sensor storing photoelectric charge generated by the photosensitive element during a storage period and reading the photoelectric charge as a variation of a voltage.

2. The image sensor as claimed in claim 1, wherein the signal detector includes:
   a sample hold circuit for holding the first signal output from the amplifier; and
   a comparator for comparing the first signal held in the sample hold circuit and the second signal output from the amplifier.

3. The image sensor as claimed in claim 2, wherein the signal detector further includes a signal converter for outputting a voltage of the variable power source corresponding to the signal on the basis of a comparison signal output from the comparator.

4. The image sensor as claimed in claim 1, wherein the signal detector includes:
   an analog-digital converter for digitizing the signal output from the amplifier;
   a memory for storing a first digital signal output from the analog-digital converter; and
   a logic circuit for comparing the first digital signal stored in the memory with a second digital signal output from the analog-digital converter after the first digital signal.

5. The image sensor as claimed in claim 1, wherein the analog switch comprises a thin-film transistor and the amplifier comprises a thin-film transistor.

6. The image sensor as claimed in claim 1, wherein the signal detector includes:
   a sample-and-hold circuit for outputting the first signal output from the amplifiers;
   a comparator for comparing the first signal held in the sample-and-hold circuit and the second signal output from the amplifiers; and
   a signal converter for outputting a voltage of the variable power source corresponding to the signal based on a comparison signal output from the comparator, wherein said analog switch comprises a thin-film transistor.

7. A driving method of an image sensor, comprising the steps of:
   applying a voltage from a variable power source to a photosensitive element of a plurality of photosensitive elements to charge electric charge the photosensitive element and holding the electric charge by turning on and off an analog switch connected to the photosensitive element;

storing photoelectric charge generated in the photosensitive element during a storage period by applying light to said photosensitive element;

outputting the charge of said photosensitive element to an amplifier connected to said photosensitive element;

reading a voltage by said amplifier after the step of storing and outputting the photoelectric charge in the photosensitive element;

holding the read signal in a signal detector;

applying a voltage having an amplitude of at least a maximum voltage variation of the photosensitive element from the variable power source to the amplifier by turning on the analog switch again;

comparing an output of the amplifier with the previously held signal in the signal detector;

reading the signal output from the amplifier as a true signal at an equal point where the output of the amplifier is coincident with the previously held signal in the comparison; and determining the voltage of the variable power source before the turning off again of the analog switch as a charge voltage to be input to the photosensitive element.

8. The driving method as claimed in claim 7, wherein the step of outputting charge includes a step of digitizing the output of the amplifier in an analog-digital converter to output a digital signal, and the holding of the digital signal in the signal detector is carried out either before an imaging cycle or on the basis of a predetermined condition by a temperature change.

9. The driving method as claimed in claim 7, wherein a detection of an equal point where the output of the amplifier is coincident with the previously held signal in the comparison is carried out in the signal detector.

10. The driving method as claimed in claim 7, wherein a plurality of amplifiers are provided for said plurality of photosensitive elements, respectively, and are successively switched on.

11. The driving method as claimed in claim 7, wherein a plurality of amplifiers are provided for said plurality of photosensitive elements, respectively, and are divided into blocks, the amplifiers being switched on every block.

12. A driving method of an image sensor, comprising the steps of:

giving a predetermined voltage from a variable power source to an amplifier through an analog switch;

holding an output of the amplifier against the voltage from the variable power source in a signal detector;

giving a fixed voltage from the variable power source to a photosensitive element of a plurality of photosensitive elements to charge electric charge in the photosensitive element by turning on and off the analog switch;

storing photoelectric charge in the photosensitive element during a storage period by applying light after the step of charging electric charge;

reading the photoelectric charge stored in the photosensitive element by the amplifier; and comparing the read value with the previously held value to read the read value as a true signal.

13. The driving method as claimed in claim 12, wherein a detection of an equal point where the read value is coincident with the previously held value in the comparison is carried out in the signal detector.

14. The driving method as claimed in claim 12, wherein the output of the amplifier is digitized in an analog-digital converter to output a digital signal, and the holding of the digital signal in the signal detector is carried out either before an imaging or on the basis of a predetermined condition by a temperature change.

15. The driving method as claimed in claim 12, wherein a plurality of amplifiers are provided for said plurality of photosensitive elements, respectively, and are successively switched on.

16. The driving method as claimed in claim 12, wherein a plurality of amplifiers are provided for said plurality of photosensitive elements, respectively, and are divided into blocks, the amplifiers being switched on every block.

17. An image sensor, comprising:

a plurality of photosensitive elements each having a first terminal connected to a predetermined voltage;

a plurality of analog switches each having a first terminal connected to the second terminal of the photosensitive elements, respectively;

a plurality of amplifiers each having an input terminal connected to the second terminal of the photosensitive elements, respectively;

a variable power source connected to a second terminal of the analog switches; and a signal detector, connected to an output terminal of the amplifiers, for holding a first signal output from the amplifiers and for comparing the first signal held with a second signal output from the amplifiers after the first signal, the image sensor storing photoelectric charge generated by the photosensitive elements during a storage period and reading the photoelectric charge as a variation of a voltage.

18. The image sensor as claimed in claim 17, wherein the signal detector includes:

a sample-and-hold circuit for holding the first signal output from the amplifiers; and a comparator for comparing the first signal held in the sample-and-hold circuit and the second signal output from the amplifiers.

19. The image sensor as claimed in claim 18, wherein the plurality of amplifiers are divided into blocks and wherein the amplifiers are switched on every block.

20. The image sensor as claimed in claim 17, wherein the plurality of amplifiers are successively switched on.

* * * * *